United States Patent [19]
Puckett

[11] Patent Number: 5,120,363
[45] Date of Patent: Jun. 9, 1992

[54] STARCH-OIL TREATMENT FOR GLASS FIBERS

[75] Inventor: Garry D. Puckett, Salisbury, N.C.

[73] Assignee: PPG Industries, Inc., Pittsburgh, Pa.

[21] Appl. No.: 639,618

[22] Filed: Jan. 10, 1991

[51] Int. Cl.$^5$ ................................................ C08L 3/02
[52] U.S. Cl. ..................................... 106/213; 106/211; 106/212; 106/287.11; 65/3.41
[58] Field of Search ............... 106/211, 212, 287.11, 106/213; 65/3.41

[56] References Cited

U.S. PATENT DOCUMENTS

| | | | |
|---|---|---|---|
| 4,221,602 | 9/1980 | Walser | 106/211 |
| 4,259,190 | 3/1981 | Fahey | 252/8.6 |
| 4,397,913 | 8/1983 | Fahey | 428/369 |
| 4,775,725 | 10/1988 | DePasquale et al. | 525/403 |

OTHER PUBLICATIONS

Filstrup, 45 CCPA 783, 251 F2d 850, 116 USPQ 440 (1958), pp. 850-853.
Anderson, CCPA 1973, 471 F2d 1237, 176 USPQ 33, pp. 1237-1244.
Nathan et al. (CCPA 1964) 328 F2d 1005, 140 USPQ 601, pp. 1005-1009.
Spero v. Ringold et al. (CCPA 1967, 377 F2d 652, 153 USPQ 726, pp. 562-660.
Riester v. Kendall (CCPA 1947) 159 F2d 732, 72 USPQ 481, pp. 732-734.
Petrarch Systems, Anderson-Arkles-Larson, 1987, 9 pages.

*Primary Examiner*—Theodore Morris
*Assistant Examiner*—David M. Brunsman
*Attorney, Agent, or Firm*—James B. Robinson; Kenneth J. Stachel

[57] ABSTRACT

An aqueous chemical treating composition for glass fibers results in improved processing of the treated fibers in a bulking operation. The size has a starch-oil size with an imine-containing alkyl alkoxy silane. More particular, the size has one starch, one nonionic oil-type lubricant, one wax, one emulsifier for the oil, a nonionic wetting agent and a cationic lubricant and glycerine and the imine-containing silane and water where the silane is present in an amount of 0.1 to 10 weight percent of the solids.

13 Claims, No Drawings

STARCH-OIL TREATMENT FOR GLASS FIBERS

The present invention is directed to an improved aqueous starch-oil chemical treatment for glass fibers.

BACKGROUND OF THE INVENTION

In producing glass fibers for textile applications, an aqueous starch-oil type chemical treatment is applied to the glass fibers during their formation. This treatment protects the fibers from interfilament abrasion when a plurality of fibers are combined to make a strand and in any subsequent twisting operation. The aqueous chemical treatment applied during formation of the glass fibers is usually referred to as a sizing composition. The production of twisted glass fiber strands involves forming the stands and collecting one or more strands on a forming package and subsequently twisting the strands on the forming package on a twist frame and collecting the twisted strand or yarn on a bobbin.

As mentioned in U.S. Pat. No. 4,397,913 (Fahey) assigned to the same assignee as the present application, glass fiber strands used in the textile industry may be in the form of twisted, plied, braided or woven products. One type of glass fiber strand yarn has a single strand that is twisted, and plied yarns have several strands that are twisted together simultaneously. As mentioned in U.S. Pat. No. 4,397,913, glass fiber yarns are used to produce bulked yarns. The sizing composition plays a roll in the production of bulk yarns. It allows for a proper amount of integrity to protect the fibers prior to bulking but also allows for separation of one or more fibers when the yarn is contacted with fluid or air pressure to bulk the yarn as described in U.S. Pat. No. 4,397,913.

It is an object of the present invention to provide an aqueous starch-oil type sizing composition for glass fibers that results in good processing into and/or performance of bulked yarns.

SUMMARY OF THE INVENTION

The aforementioned objects and other objects are accomplished by the present invention. The broadest aspect of the present invention is an aqueous chemical treating composition, hereinafter referred to as a sizing composition, which has one or more starches and one or more nonionic oil lubricants and around 0.1 to around 10 weight percent of the solids of a polyamino silane formed by the reaction of ethylene imine or polyethylene imine with an amino or diamino alkyl alkoxy silane. In addition, hydrolyzed derivatives of the silane and salts of the silances generally characterized as silanolates can be used.

The present invention in a narrower aspect is an aqueous sizing composition having one or more starches, one or more nonionic oil lubricants, wax, an effective emulsifying or dispersant amount of one or more emulsifiers for the oil and possibly the wax, cationic lubricant in an effective cationic lubricating amount, a wetting agent in an effective amount, and an antimicrobial compound in an effective amount. The amounts of these materials in the aqueous size on a weight percent basis of the solids or nonaqueous components of the size can vary within the below-indicated ranges. The amount of starch is in the range of around 50 to 60 weight percent, the amount of the emulsion of the nonionic oil lubricant, wax, emulsifying agent and wetting agent is around 30 to 35 weight percent, and the amount of cationic lubricant is around 1 to 8 weight percent, the amount of the organo silane coupling agent that is a reaction product of an imine compound and amino silane compound is in the range of around 0.1 to 2 weight percent. Generally, the total solids ranges between 0.5 and 3 weight percent of the aqueous size.

The aqueous sizing composition is used to treat glass fibers during their formation when they are formed as individual fibers and combined to produce a strand constituted of a plurality of the fibers. Generally, the amount of sizing composition on the fibers is expressed on a loss on ignition (LOI) basis and is in the range of around 0.1 to about 2 weight percent of the strand of sized glass fibers.

DETAILED DESCRIPTION OF THE INVENTION

In the aqueous sizing of the present invention, any starch-oil type sizing compositions having at least one emulsifier for emulsifying the oil in water that are known to those skilled in the art of treating glass fibers with starch-oil sizing compositions can be used. Nonexclusive examples of starch-oil type sizes including those with mixtures of starches and chemically modified starches, oils and oil emulsifiers useful in the present invention are given in U.S. Pat. Nos. 4,397,913 (Fahey) 4,296,173; 4,259,190; 4,233,046; 4,221,602; 4,002,445; 3,227,192; 3,265,516; all of which are hereby incorporated by reference. In addition, mixtures and combinations of the various starches and various oils known to those skilled in the art can be used.

The effective film forming amount of the starch is generally in the range of around 50 to 75 weight percent of the nonaqueous components of the aqueous chemical treating composition. Nonexclusive examples of starch mixtures that can be used as detailed in the aforementioned patents that were incorporated by reference include a high amylose starch and a low amylose starch mixture. The low amylose starch is usually derived from potato or derivatized corn starch such as cationic, phosphatized, ethoxylated or esterified derivatives and it is present in an amount of around 20 to 30 percent by weight of the mixture. The high amylose starch which is present in an amount of around 50 to 60 percent by weight of the nonaqueous components of the aqueous chemical treating composition usually contains around 55 percent by weight amylose with the remainder being amylopectin. The total amylose content of the starch mixture is generally in the range of about 35 to about 55 percent by weight of the total starch content. A most suitable starch mixture is one having around 75 weight percent to about 95 percent of a underivatized, high amylose starch and around 5 percent of a cationic corn starch with 50 percent amylose and granules having a diameter in the range of 3 to 20 nanometers. Preferably the starch that is used is at least one that has a Brabender curve with values equivalent to one in the range of about 500 to about 1200 Brabender Units at around 9.5 percent dry solids and at a gel temperature in the range of about 65 to about 90 degrees C. and at a maximum viscosity. Such a modified amylose-containing starch can be derived from any starch sources such as corn, wheat, potato, tapioca, waxy maize, sago, rice and hybrid starches, etc. A most suitable example of a commercially available starch is that derived from either corn starch or hybrid corn starch from National Starch and Chemical Company under the trade designation of Nabond starches and from the American Maize Products Company under the trade designation of Amaizo 310 starch.

Before the starch is employed in the aqueous sizing composition of the present invention, it is cooked to facilitate its suspension into the size. The cooking is accomplished in a jet cooker such as that supplied by National Starch and Chemical Company and the temperature of the cooking is in the range of around 235° F. (113° C.) to around 265° F. (129° C.). The type of starch that is cooked allows for only partial but easy cooking. The modified starches are employed in the aqueous sizing composition in an amount in the range of about 0.7 to about 2 weight percent based on the aqueous sizing composition.

A typical hydrogenated vegetable oil would be hydrogenated vegetable oils where the oils are: cotton seed oil, corn oil, soybean oil, fatty triglyceride, glyceroltrioleate, their hydrogenation products and the like. The amount of the nonionic lubricant or lubricants present in the aqueous sizing composition is in the range of about 0.3 to about 0.7 weight percent of the aqueous composition. On a solids basis (nonaqueous components basis), the amount of the nonionic lubricant present in the sizing composition is in the broad range of about 15 to about 36 weight percent.

Since the oil is present in the aqueous sizing composition and emulsifier is present to make the oil miscible in the aqueous sizing composition. Any suitable emulsifier that is known to those skilled in the art having the proper hydrophylic-lipophylic balance (HLB). One or more emulsifiers may be used. A suitable emulsifier is a polyoxyethylene (5) sorbitan mono-oleate in an effective emulsifying amount. Other nonexclusive examples of suitable emulsifiers or dispersants for the oils are those that are nonionic and that have an HLB in the range of about 8 to about 20 or any mixtures of emulsifiers and dispersants yielding an HLB in this range.

The aqueous sizing composition can also have one or more wax components which can be any suitable waxes known to those skilled in the art or as shown in U.S. Pat. No. 4,397,913 hereby incorporated by reference. One nonexclusive example of a suitable wax is paraffin wax. The amount of the wax in the aqueous sizing composition of the present invention is in the range of about 0.07 to about 0.37 weight percent based on the aqueous sizing composition. On a nonaqueous ingredients basis, the amount of wax present is the generally range of about 3 to about 6 and more specifically in the range of about 3 to less than 5.

The aqueous sizing composition can also have a starch plasticizer to lessen the brittleness of the glass fiber strands. Such a plasticizer useful in the present invention is a polyethylene glycol with an average molecular weight of about 300 available as the "Carbowax® 300" product. In place of the low molecular weight polyethylene glycol, glycerine can be employed in a similar weight concentration. The amount of the starch plasticizer present in the aqueous sizing composition is in the range of about 0.07 to about 0.14 weight percent. On a nonaqueous ingredients basis, the amount of the starch plasticizer present is generally in the range of about 3 to about 6 and more specifically in a range of about 3 to less than 5.

The aqueous sizing composition of the present invention also has a cationic lubricant or textile softener to provide a softening action to sized glass fibers. Typical cationic lubricants or softeners are alkyl imidazoline derivatives such as those described in U.S. Pat. No. 2,200,815; 2,267,965; 2,268,273; 2,355,837, which are hereby incorporated by reference. The material designated "Cation-X ®" is an example of such a material wherein the alkyl imidazoline derivative is the reaction product of stearic acid, tetraethylene pentamine and acetic acid. Acid solubilized, water dispersible, stearic amides and anhydrous acid, and solubilized, water dispersible lower molecular weight fatty acid amides as well as anhydrous acid, solubilized polyunsaturated lower molecular weight fatty acid amides can also be used as the cationic lubricants. The amount of the cationic lubricants used in the sizing composition of the present invention is in the range of about 0.14 to about 0.28. On a nonaqueous basis, the amount of the cationic lubricant is in the range of about 7 to about 14, more specifically about 7 to about 12.

The aqueous sizing composition of the present invention also contains a particularly type of silane coupling agent which gives good processability in applying the aqueous sizing composition to glass fibers and which gives the sized glass fiber strands good textile handling characteristics. This silane coupling agent is an imine organosilane that is a reaction product of a mono or diamino alkyl alkoxy silane with ethylene imine or polyethylene imine. A suitable monoaminoalkylalkoxysilane is aminopropyltrimethoxy silane and it can be reacted with polyethyleneimine. The resulting reaction product can have a formula such as:

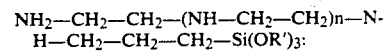

wherein R' is $C_1$ to $C_4$ alkyl (e.g., methyl, ethyl, propyl, etc.), and n is an integer from about 4 to about 37 or in molecular weight terms from about 400 to about 1800.

A commercially available material that has such a reaction product is available as N-trimethoxysilylpropyl)-polyethyleneimine also known as polyethyleneimino propyl trimethoxy silane in a 50 percent isopropanol solution available from Hüls America Inc., 2570 Pearl Buck Road, Bristol, Pa. 19007 under the trade designation CPS076. This material has a molecular weight average of 1000 and a refractive index of 1.442 and a specific gravity of 0.91 and a viscosity of 175-250 centistokes. Another suitable imineorganosilane is a reaction product of:

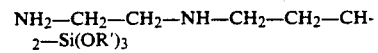

wherein R' is $C_1$ to $C_4$ alkyl (e.g., methyl, ethyl, propyl, etc.) with ethylene imine

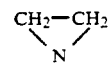

to form the compounds represented by the following:

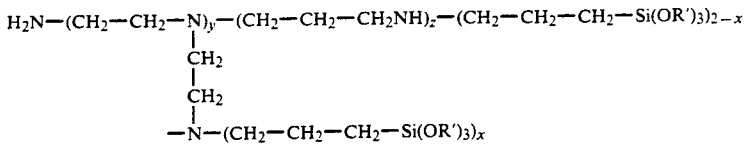

wherein x is 0 or an integer from 1 to 2 and y and z are integers with a valve to give a molecular weight for this portion of the molecule in the range from about 400 to about 1800 and where R' is methyl, although it will be understood that the other alkoxy derivatives can be prepared in a like manner. In general, use is made of from 1 to 10 moles of the imine per mole of diamino starting material.

On a nonaqueous basis, the amount of the imine organosilane coupling agent is in the range of about 0.1 to about 10 weight percent.

Also the size composition may have a wetting agent which is preferably nonionic although it can also be a cationic wetting agent. Any material may be used which is noted as skilled in the art to reduce the surface tension of the aqueous size so that it is about 25 to 35 dienes per centimeter. A particularly suitable nonionic wetting agent is octyl Phenoxypoly-(ethyleneoxy)ethanol available under the trade designation IGEPAL CA630. This material is present in an effective wetting agent amount.

Also usually present in the sizing composition since starch is present is a small amount of fungicide and/or bactericide to deter the growth of fungi and/or bacteria in the size. Any fungicide or bactericide known to those skilled in the art can be used such as one of the organometallic quaternary-type fungicides, for example, tributyltin oxide. The fungicide is employed in sufficient amounts to prevent or retard mold attack or growth on the glass fibers containing starch derivative. Suitable effective amounts are those equivalent to about 3 milliliter for every 75 gallons of the sizing composition and this amount can be varied depending on the amount of starch used in the size.

The total solids (nonaqueous) content of the aqueous size is in the range of around 0.5 to about 20 percent by weight and preferably around 1 to 5 weight percent and most preferably around 1.9 to 2.6 weight percent. In all circumstances, the total solids should be adjusted to a level whereby the viscosity of the size is acceptable for application to the glass fibers during their formation which is typically a viscosity of around 10 to 50 centipoise at 60° C.

The size composition of the present invention is applied to glass fibers from an applicator during the formation of the fibers. The size can be applied to glass fibers having any glass composition known to those skilled in the art. These include E-glass 621-Glass, S-Glass and low or free boron and/or fluorine derivatives thereof. After the sizing composition is applied to the fibers, the fibers are gathered into one or more strands by means of a gathering shoe and wound on a rotating drum-type winder to make a forming package. The cullet on which the forming package rides can be rotated at revolutions of around 4,000 to 5,000 per minute and a spiral can be used to direct the strand onto the forming package. The applicator that applies the size to the fibers is generally a rotating belt-type applicator but any applicator known to those skilled in the art can be used. After the winding of the forming packages is complete, the package is placed in an oven for drying. Other conventional methods of applying the size to the fibers can be used such as spraying, dipping and the like. The filament diameters of the fibers to which the size is applied can range from around 3 to more than 30 microns. The glass fibers can be gathered into any strand construction noted to those skilled in the art; for example, D, DE-75, G-37, G-75 and/or G-150 strand constructions can be formed. The aqueous size applied to the fibers results in treated fibers that upon drying have a dried residue of the aqueous size on the fibers in an amount of around 0.1 to about 1.2 weight percent and preferably less than 1 weight percent of the sized glass fiber strand on a Loss on Ignition (LOI) basis. The loss on ignition test is a well-known technique determining the amount of chemical coatings on glass fibers.

The aqueous size composition can be formed by any method known to those skilled in the art for incorporating components that are compatible with water to varying degrees from water-soluble to slightly water soluble to water insoluble for an oil. Typically, the oil is emulsified along with one or more waxes where the various waxes may vary one from the other in their degree of water solubility. This variability may be from water soluble to water insoluble. Also, the nonionic wetting agent can be added to the emulsion. The starch is cooked in any manner known to those skilled in the art and the components can be added simultaneously or sequentially in such a manner to form a stable size composition.

PREFERRED EMBODIMENT OF THE INVENTION

The aqueous glass fiber size of the present invention preferably has the following formulation.

TABLE I

| Component | Grams/10 Gal. | % Effective Solids | Weight Percent on Nonaqueous Basis (Dry Weight) |
|---|---|---|---|
| Modified starch Nabond or Amaizo (310) | 500–575 | 90.52 | 5.6–5.8 |
| Hydrogenated Soybean Oil Eclipse 102 | 165–175 | 10.0 | 19.4–20.5 |
| Paraffin wax | 84–86 | 10.0 | 9.5–10.5 |
| Ethylene oxide derivative of sorbitan ester (Tween 81 emulsifier) | 13–17 | 97 | 1.6–1.8 |
| Octyl phenoxy poly(ethyleneoxy) ethanol | 9–11 | 100 | 1.1–1.2 |

TABLE I-continued

| Component | Grams/10 Gal. | % Effective Solids | Weight Percent on Nonaqueous Basis (Dry Weight) |
|---|---|---|---|
| Igepal CA630 wetting agent Alkyl imidazoline reaction product of tetraethylene pentamine stearic acid Cation-X | 95–99 | 36 | 3.9–4.2 |
| Glycerine | 42–44 | 100 | 4.8–5.2 |
| Imine organo silane (CPS-076) | 13–17 | 50 | 0.8–0.9 |
| Acetic acid | 2 | 100 | 0.2 |
| CL-2141 bactericide | 0.8 | 10 | 0.08 |

The aqueous size is prepared utilizing municipal water which has been filtered or demineralized. The starch is combined with cold water in a starch slurry tank and the starch is cooked at a temperature of about 145° F. (118° C.) although cooking at a temperature of around 255° F. to 265° F. (125° C. to 129° C.) can occur alternatively in a jet cooker. In a separate mixing vessel water is added and the paraffin wax, nonionic oil, emulsifier and wetting agent are added to the mix tank. The temperature of the mix tank is brought to that in the range of 170° F. to 180° F. (76° C. to 82° C.) to melt the wax. The mixture is mixed with an Eppenbach mixer for around five minutes. Hot water at a temperature of around 170° F. to 180° F. is added slowly until the mixture passes through its inversion point and becomes an oil-in-water emulsion. An amount of warm water at about 145° F. (63° C.) of around 3 to 6 volume percent of the total volume of the size to be prepared is added to a premixed tank. The Cation-X cationic lubricant is added to the premix tank and stirred at the warm temperature until dissolved. The temperature should not exceed around 160° F. (71° C.). This diluted cationic lubricant is added to the main mix tank. Glycerine is added directly to the main mix tank in the specified amount. The specified quantity of acetic acid is added to a premix tank having cold water in an amount of around 3 to 6 volume percent of the total volume of size being prepared. The temperature of the cold water is 60° to 80° F. (15° C. to 27° C.). This addition is with slow agitation. The imine organosilane is added slowly with agitation which is continued for around 10 minutes or until the solution becomes clear. This diluted silane is added to the main mix tank. The bactericide is then added directly to the main mix tank. The mixture in the main mixed tank is diluted to its final volume with hot water and mixed slowly for around five minutes. The starch-oil size has a percent solids of 2.1 to 2.5 percent, a pH of 5.2 to 6.2, a viscosity of around 20 centipoise maximum and is placed on the fibers to give an LOI in the range of around 0.3 to 0.7 percent.

The preferred sizing composition and the alternative embodiment sizing composition are used to treat strands with medium diameter glass fibers such as known as E fibers through K fibers having filament diameters from about $25 \times 10^{-5}$ inches to about $50 \times 10^{-5}$ inches in any conventional - manner. (Also the alternative embodiment size is used to treat $10 \times 10^{-5}$ to about $40 \times 10^{-5}$ inches) in a conventional manner. The sizing composition can be applied to the fibers prior to the time they are gathered together to form a strand containing myriad fibers, generally on the order of 200 or more by means of a roller applicator which is partially submerged into the sizing composition which is contained in a reservoir. Such an applicator is shown in more detail in U.S. Pat. No. 2,728,972 hereby incorporated by reference. Also any applicator known to those skilled in the art for applying aqueous sizing composition to glass fibers can be used. The fibers are gathered into strands by a gathering shoe and wound onto a forming package rotating generally at an RPM of 4,000 to 5,000 and higher depending on winder capability which is on the order of around 14,000 feet per minute. Any other methods of applying the sizing composition to the strands of glass fibers such as a pad applicator, may be employed and a strand may be formed by means other than winding on the forming tubes such as by a means of a pair of rotating wheel pullers which direct fibers into a suitable collecting device. The glass fiber strands wound on a forming package are then dried in an oven or allowed to air dry. The forming package of the glass fiber strand or strands can be used directly in a bulking operation to produce bulked glass fiber strand yarn.

Alternatively the glass fiber strand or strands present in a forming package can be placed on a bobbin for use in a bulking operation. The glass fiber strand from a forming package is placed on a bobbin by unwinding strand from a plurality of forming packages on a twist frame onto a plurality of bobbins with one or more strands per bobbin. During the unwinding and rewinding step, a twist is imparted into the strand which provides integrity for subsequent processing.

The dried glass fiber strand preferably from forming packages can be bulked by any method of bulking glass fiber strands to produce yarn that has convoluted loops or slubs, but it is preferred to produce texturized glass fiber yarn. The texturized glass fiber yarn can be one strand or a multitude of strands comprising the yarn. One method of preparing the texturized glass fiber strand yarn can be that shown in U.S. Pat. No. 4,003,111 (Drummond) which is hereby incorporated by reference. It is preferred to produce the texturized glass fiber yarn by passing the yarn composed of one or more strands through a needle venturi type air jet.

To further illustrate the aqueous sizing composition and the sized glass fiber strands and bulked glass fiber strand yarn of the present invention reference should be made to the following examples.

EXAMPLE 1

An aqueous sizing composition was prepared in the manner described in the preferred embodiment having the following formulation:

| Ingredients | Amount in Grams for 10 Gallons |
|---|---|
| Starch (Nabond) [Partially cooked at 245° F.] (118° C.) | 538 |
| Soybean Oil | 170 |
| Paraffin Wax | 85 |

-continued

| Ingredients | Amount in Grams for 10 Gallons |
|---|---|
| Emulsifier Tween 81 | 15 |
| Igepal CA-620 | 10 |
| Glycerine | 43 |
| Cationic Lubricant (Cation-X) | 97 |
| Imine Silane | |
| Coupling Agent (CPS-076) | 15 |
| Acetic Acid | 2.1 |
| Bactericide | 0.8 |
| Water sufficient to dilute 10 gallons 37.85 liters | |

The solids content of the sizing composition was 2.3 percent with a pH of 5.68 and a viscosity of 8.0 centipoise.

The sizing of Example 1 was applied to glass fibers having a G filament diameter and made into a strand construction of a G37. The forming packages were dried in air for 24 hours and twisted onto bobbins to produce twisted yarn having a 1/0 0.7 Z twist. The material was subsequently bulked into single end texturized yarn at speeds approaching 800 yards per minute with minimal jet below out end bobbin sloughing. The bulked yarn had a 25 percent improvement in tensile strength and a 5 percent improvement in bulk level based on air permeability. The processing of the yarn was with minimal bobbin sloughs and minimal jet blow out and no package build problems. In the bulk level and product exhibited an average of 74 entanglements per meter from 8 measurements with values ranging from 70 to 80. The product has 9.1 pounds of tensile strength compared to that of a commercially available yarn having 7.3 pounds of tensile strength.

The foregoing has described an aqueous sizing composition for glass fibers to result in bulked yarn that can be produced at faster speeds and with minimal processing problems. The sizing composition can be used on a wide range of filament diameters without the necessity of extra ingredients for fine fibers. The sizing composition is a starch-oil size with an imine alkyl alkoxy silane also having one or more emulsifiers, one or more starch plasticizers, a cationic lubricant and a nonionic wetting agent. It has been unexpectedly discovered that this starch-oil sizing produces improved performance results for the sized glass fibers with a much reduced amount of silane than has been used in prior commercial starch-oil sizes.

I claim:

1. An aqueous starch-oil size composition for treating glass fibers during their formation to protect the fibers against interfilament abrasion when the fibers are gathered into strands to allow for fast removal of the strand or strands from supply packages, and to allow for faster processing speeds in bulking the improvement comprising: the starch-oil size having an imine alkyl alkoxy silane coupling agent that is a reaction product of an imine compound selected from the group consisting of: ethylene imine and polyethyleneimine and of an amino alkyl alkoxy silane selected from the group consisting of: mono amino alkyl alkoxy silane and diamino alkyl alkoxy silane, where the imine alkyl alkoxy silane is present in an amount in the size of around 0.1 to around 10 weight percent of the solids.

2. The size of claim 1 wherein the amount of the imine silane coupling agent is in range of 0.1 to 2 weight percent of the solids or nonaqueous components of the size where the size has a total solids in the range of 0.5 to 3 weight percent.

3. The size of claim 1 wherein the imine silane coupling agent is (N-trimethoxysilylpropyl)-polyethylenimine in an amount in the range of 0.5 to 1.5 weight percent of the solids or nonaqueous components of the size where the size has a total solids in the range of 0.5 to 3 weight percent.solids or nonaqueous components of the size.

4. The size of claim 1 wherein the imine silane coupling agent is (N-trimethoxysilylpropyl)-polyethylenimine in a 50 percent isopropanol solution having a molecular weight average of 1,000 and a refractive index of 1.442 and a specific gravity of 0.91 and a viscosity of 175 to 250 centistokes present in an amount in the range of 0.5 to 1.5 weight percent of the solids or nonaqueous components of the size where the size has a total solids in the range of 0.5 to 3 weight percent solids or nonaqueous components of the size.

5. The size of claim 1 wherein the imine silane coupling agent is a reaction product of aminopropyltrimethoxy silane and polyethyleneimine having a formula such as:

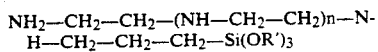

$$NH_2-CH_2-CH_2-(NH-CH_2-CH_2)_n-NH-CH_2-CH_2-CH_2-Si(OR')_3$$

wherein R' is $C_1$ to $C_4$ alkyl (e.g., methyl, ethyl, propyl, etc.), and n is an integer from about 4 to about 37 or in molecular weight terms from about 400 to about 1800.

6. The size of claim 1 wherein the imine silane coupling agent is a reaction product of a diamino alkyl alkoxy silane having the formula:

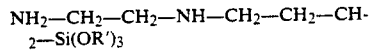

$$NH_2-CH_2-CH_2-NH-CH_2-CH_2-CH_2-Si(OR')_3$$

wherein R' is $C_1$ to $C_4$ alkyl (e.g., methyl, ethyl, propyl, etc.) with ethylene imine

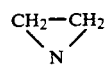

to form the compounds represented by the following:

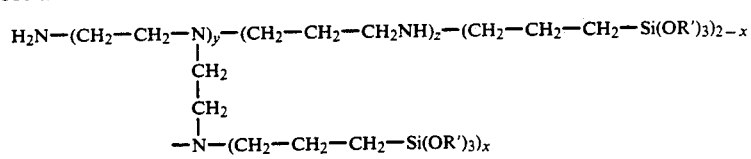

$$H_2N-(CH_2-CH_2-N)_y-(CH_2-CH_2-CH_2NH)_z-(CH_2-CH_2-CH_2-Si(OR')_3)_{2-x}$$
$$|$$
$$CH_2$$
$$|$$
$$CH_2$$
$$|$$
$$-N-(CH_2-CH_2-CH_2-Si(OR')_3)_x$$

wherein x is 0 or an integer from 1 to 2 and y and z are integers with a valve to give a molecular weight for this portion of the molecule in the range from about 400 to about 1800 and where R' is $C_1$ to $C_4$ alkyl (e.g., ethyl, propyl, etc.) and wherein use is made of from around 1 to around 10 moles of the imine per mole of diamino starting material.

7. An aqueous bulking size composition for glass fibers for application to the fibers during their formation to protect the fibers against interfilament abrasion when the fibers are gathered into strands to allow for a fast removal of the strand or strands from supply packages to a bulking operation for the strands and to allow faster bulking processing speeds where the fibers within the strand become separated to a degree when the strand or strands are subjected to the separating force of the bulking operation, comprising:

a. starch having Brabender values equivalent to gel temperature in the range of about 65° C. to about 90° C. and maximum viscosity in the range of about 500 BU to about 1200 BU at a 9.5 dry solids percent concentration in an amount in the range of about 30 to about 60 weight percent of the nonaqueous components of the composition.

b. hydrogenated nonionic lubricant in the amount in the range of about 15 to about 36 weight percent of the nonaqueous components;

c. one or more waxes in an amount of about 3 to about 6 weight percent of the nonaqueous components;

d. one or more nonionic emulsifiers giving a total HLB in the range of about 8 to about 12 for emulsification of the nonionic lubricant;

e. a starch plasticizer in the amount of about 3 to about 6 weight percent of the nonaqueous components;

f. a cationic lubricant in the amount of about 7 to about 14, weight percent of the nonaqueous components;

g. one or more imine alkyl alkoxy silane amino silane coupling agents in an amount of about 0.1 to about 3 weight percent of the nonaqueous components, and h. an amount of water to yield a total solids for the size in the range of about 0.5 to about 4 weight percent.

8. The size of claim 7 wherein the amount of the imine silane coupling agent is in range of 0.1 to 2 weight percent of the solids or nonaqueous components of the size where the size has a total solids in the range of 0.5 to 3 weight percent.

9. The size of claim 7 wherein the imine silane coupling agent is (N-trimethoxysilylpropyl)-polyethylenimine in an amount in the range of 0.5 to 1.5 weight percent of the solids or nonaqueous components of the size where the size has a total solids in the range of 0.5 to 3 weight percent.solids or nonaqueous components of the size.

10. The size of claim 7 wherein the imine silane coupling agent is (N-trimethoxysilylpropyl)-polyethylenimine in a 50 percent isopropanol solution having a molecular weight average of 1000 and a refractive index of 1.442 and a specific gravity of 0.91 and a viscosity of 175 to 250 centistokes present in an amount in the range of 0.5 to 1.5 weight percent of the solids or nonaqueous components of the size where the size has a total solids in the range of 0.5 to 3 weight percent.solids or nonaqueous components of the size.

11. The size of claim 7 wherein the imine silane coupling agent is a reaction product of aminopropyltrimethoxy silane and polyethyleneimine having a formula such as:

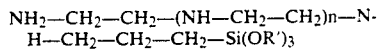

wherein R' is $C_1$ to $C_4$ alkyl (e.g., methyl, ethyl, propyl, etc.), and n is an integer from about 4 to about 37 or in molecular weight terms from about 400 to about 1800.

12. The size of claim 7 wherein the imine silane coupling agent is a reaction product of a diamino alkyl alkoxy silane having the formula:

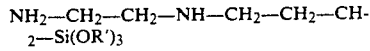

wherein R' is $C_1$ to $C_4$ alkyl (e.g., methyl, ethyl, propyl, etc.) with ethylene imine

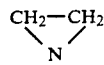

to form the compounds represented by the following:

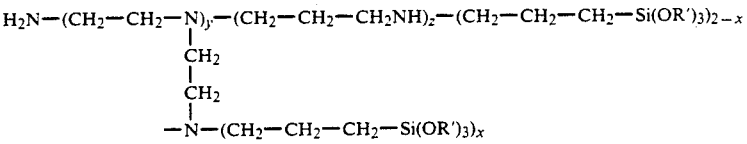

wherein x is 0 or an integer from 1 to 2 and y and z are integers with a valve to give a molecular weight for this portion of the molecule in the range from about 400 to about 1800 and where R' is $C_1$ to $C_4$ alkyl (e.g., methyl, ethyl, propyl, etc.) and wherein use is made of from around 1 to around 10 moles of the imine per mole of diamino starting material.

13. An aqueous bulking side composition for glass fibers for application to the fibers during their formation to protect the fibers against interfilament abrasion when the fibers are gathered into strands to allow for a fast removal of the strand or strands from supply packages to a bulking operation for the strands and to allow faster bulking processing speeds where the fibers within the strand become separated to a degree when the strand or strands are subjected to the separating force of the bulking operation, comprising:

a. starch derived from corn starch or hybrid corn starch having Brabender values equivalent to gel temperature in the range of about 65° C. to about 90° C. and maximum viscosity in the range of about 500 BU to about 1200 BU at a 9.5 dry solids percent concentration in an amount in the range of about 30 to about 60 weight percent of the nonaqueous components of the composition that is cooked in a jet cooker at a temperature in the range of around 235° F. (113° C.) to around 255° F. (124° C.), which allows for only partial but easy cooking;

b. hydrogenated nonionic lubricant selected from the group of hydrogenated vegetable oils where the oils are selected from: cotton seed oil, corn oil, soybean oil, fatty triglyceride, glyceroltrioleate present in the sizing composition in an amount in the broad range of about 15 to about 36 weight percent of the nonaqueous components;

c. paraffin wax in an amount of about 3 to about 6 weight percent of the nonaqueous components;
d. ethylene oxide derivative of sorbitan ester emulsifier selected from the group consisting of polyoxyethylene (5) sorbitan monooleate, polyoxyethylene (20) sorbitan monostearate present in an amount in the range of about 8 to about 12 for emulsification of at least the nonionic lubricant;
e. a starch plasticizer selected from the group consisting of polyethylene glycol with an average molecular weight of about 300 and glycerine present in the amount of about 3 to about 6 weight percent of the nonaqueous components;
f. a cationic lubricant selected from the group consisting of: a) alkyl imidazoline derivative that is the reaction product of stearic acid, tetraethylene pentamine and acetic acid, and b) acid solubilized, water dispersible, stearic amides and anhydrous acid, and c) solubilized, water dispersible lower molecular weight fatty acid amides as well as anhydrous acid, solubilized polyunsaturated lower molecular weight fatty acid amides in the amount of about 7 to about 14 weight percent of the nonaqueous components;
g. one or more imine alkyl alkoxy silane amino silane coupling agents selected from the group consisting of: 1) (N-trimethoxysilylpropyl)-polyethylenimine in a 50 percent isopropanol solution having a molecular weight average of 1000 and a refractive index of 1.442 and a specific gravity of 0.91 and a viscosity of 175–250 centistokes present in an amount in the range of 0.5 to 1.5 weight percent of the solids or nonaqueous components of the size where the size has a total solids in the range of 0.5 to 3 weight percent. solids or nonaqueous components of the size; 2) a reaction product of aminopropyltrimethoxy silane and polyethyleneimine having a formula such as:

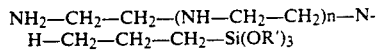

wherein $R'$ is $C_1$ to $C_4$ alkyl (e.g., methyl, ethyl, propyl, etc.), and n is an integer from about 4 to about 37 or in molecular weight terms from about 400 to about 1800; 3) a reaction product of a diamino alkyl alkoxy silane having the formula:

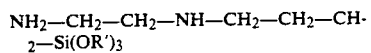

wherein $R'$ is $C_1$ to $C_4$ alkyl (e.g., methyl, ethyl, propyl, etc.) with ethylene imine

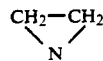

to form the compounds represented by the following:

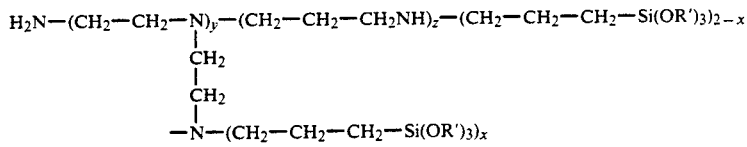

wherein x is 0 or an integer from 1 to 2 and y and z are integers with a valve to give a molecular weight for this portion of the molecule in the range from about 400 to about 1800 and where $R'$ is $C_1$ to $C_4$ alkyl and wherein use is made of from around 1 to around 10 moles of the imine per mole of diamino starting material.in an amount of about 1 to about 3 weight percent of the nonaqueous components, and
h. acetic acid in an effective amount of at least partially hydrolysis the silane; and
i. an amount of water to yield a total solids for the size in the range of about 1.5 to about 4 weight percent.

* * * * *

UNITED STATES PATENT AND TRADEMARK OFFICE
CERTIFICATE OF CORRECTION

PATENT NO. : 5,120,363

DATED : June 9, 1992

INVENTOR(S) : Garry D. Puckett

It is certified that error appears in the above-identified patent and that said Letters Patent is hereby corrected as shown below:

On the cover page under OTHER PUBLICATIONS, column 2 line 4, "pp. 562-660" should read "pp. 652-660".

Claim 3, column 10, line 13, delete "." between the words "percent" and "solids".

Claim 5, column 10, line 28, delete "such as".

Claim 5, column 10, line 30, "N-" should read "NH" with the formula all on the same line.

Claim 6, column 10, line 40, "CH-" should read "CH2" with the formula all on the same line.

Claim 6, column 10, line 59, delete "and y and z are integers with a valve to give a molecular weight for this portion of the molecule in the range from about 400 to about 1800".

Claim 6, column 10, line 62 "(e.g., ethyl, propyl, etc.)" should read "(e.g., methyl, ethyl, propyl, etc.)".

Claim 7, column 11, line 21, insert "weight percent" after "12".

Claim 7, column 11, line 36, delete "," after "14".

Claim 9, column 11, line 55, delete "." between "percent" and "solids".

Claim 10, column 11, line 65, delete "." between "percent" and "solids".

Claim 11, column 12, line 2, delete "such as".

Claim 11, column 12, line 4, "N-" should read "NH" with the formula all on the same line.

Claim 12, column 12, line 13, "CH-" should read "$CH_2$" with the formula all on the same line.

Claim 12, column 12, line 26, replace y and z in formula with 2 and 2 to read as follows: "H2N-(CH2-CH2-N)2-(CH2-CH2-CH2NH)2-(CH2-CH2-CH2-Si(OR')3)2-x".

UNITED STATES PATENT AND TRADEMARK OFFICE
CERTIFICATE OF CORRECTION

PATENT NO. : 5,120,363
DATED : June 9, 1992
INVENTOR(S) : Garry D. Puckett

It is certified that error appears in the above-identified patent and that said Letters Patent is hereby corrected as shown below:

Claim 12, column 12, line 34, delete "and y and z are integers with a valve to give a molecular weight for this portion of the molecule in the range from about 400 to about 1800".
Claim 13, column 13, line 7, insert "weight percent" after "12".
Claim 13, column 13, line 44, delete "." after "percent".
Claim 13, column 14, line 2, delete "such as".
Claim 13, column 14, lines 4 and 5, "N-" should read "NH" with the formula all on the same line.
Claim 13, column 14, lines 12 and 13, "CH-" should read "CH2" with the formula all on the same line.
Claim 13, column 14, line 26, replace y and z in formula with 2 and 2 to read as follows: "H2N-(CH2-CH2-N)2-(CH2-CH2-CH2NH)2-(CH2-CH2-CH2-Si(OR')3)2-x".
Claim 13, column 14, line 32, delete "and y and z are integers with a valve to give a molecular weight for this portion of the molecule in the range from about 400 to about 1800".

Claim 7, column 11, line 14, add ";" after "composition". (delete the period)
Claim 13, column 14, line 38, delete "." between "material" and "in".
Claim 13, column 14, line 40, add ";" after "components". (delete the comma)
Claim 13, column 14, line 41, "of at least" should read "to at least".

Signed and Sealed this

Seventeenth Day of March, 1998

Attest:

Attesting Officer

BRUCE LEHMAN
Commissioner of Patents and Trademarks